June 7, 1932.  H. F. INGWARSON  1,861,699
TELLTALE FOR AUTOMOBILE HEADLIGHTS
Filed Feb. 7, 1931
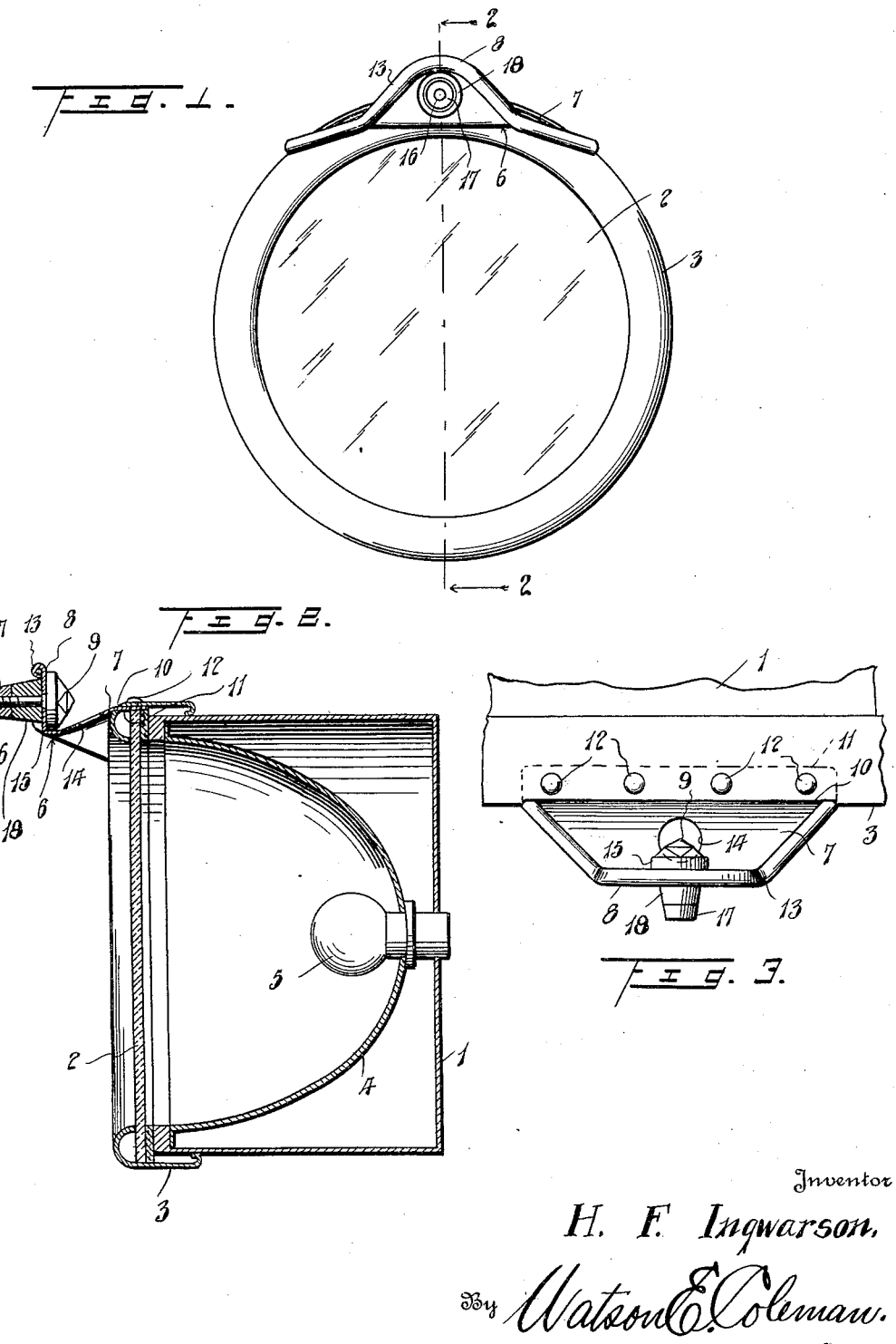
Inventor
H. F. Ingwarson,
By Watson E. Coleman.
Attorney Patented June 7, 1932

1,861,699

UNITED STATES PATENT OFFICE

HJALMAR F. INGWARSON, OF GERBER, CALIFORNIA

TELLTALE FOR AUTOMOBILE HEADLIGHTS

Application filed February 7, 1931. Serial No. 514,296.

This invention relates to automobile headlights, and more particularly to means through the medium of which the driver of an automobile may, without leaving his seat, ascertain whether his headlights are lit.

The invention has for one of its objects to provide means of the character stated which shall be novel, simple, inexpensive and efficient, which shall be adapted to be easily and quickly secured to a headlight without any material alteration in the construction thereof, and the use of which will not constitute a violation of any known traffic regulation.

To attain the foregoing and other objects, the invention comprehends the provision of means of the character stated which shall embody a colored member or button, and a bracket carrying the button and adapted to support it from the headlights in such position as to permit it to be illuminated by the rays of the headlight and to render it clearly visible from the driver's seat of the automobile.

The invention further comprehends the provision of means of the character stated wherein the bracket shall embody angularly related attaching and supporting members, wherein the attaching member shall be adapted to be secured to and extend downwardly and forwardly from the upper side of the lens retaining ring of the headlight, wherein the attaching member shall be provided forwardly of the ring with an opening, wherein the supporting member shall extend forwardly from the front end of the attaching member, and wherein the colored button shall be secured to the rear side of the supporting member directly over the opening in the attaching member so as to permit it to be illuminated by the rays of the headlight and to render it visible from the driver's seat.

The invention is hereinafter fully described and claimed, and illustrated in the accompanying drawing, wherein:—

Figure 1 is a view in front elevation of an automobile headlight embodying my invention or telltale.

Figure 2 is a sectional view taken on a vertical plane extending centrally and longitudinally through the headlight and the telltale, and Figure 3 is a top plan view of a fragmentary portion of the headlight and the telltale.

Referring in detail to the drawing, 1 designates the casing, 2 the lens, 3 the lens retaining ring, 4 the reflector, and 5 the lamp of an automobile headlight of well-known construction.

The telltale comprises a sheet metal bracket 6 which consists of angular related attaching and supporting members 7 and 8, respectively, and a colored member or button 9 carried by the supporting member of the bracket. The bracket attaching member 7 is curved longitudinally to conform to the curvature of the lens retaining ring 3, and is secured to and extends downwardly and forwardly from the upper side of the ring. The lens retaining ring 3 is provided in the front side of its upper portion with a slot 10 through which the rear portion or flange 11 of the bracket member 7 extends, the flange contacting with the lower surface of the upper side of the ring, and being secured to the ring by rivets 12. The bracket supporting member 8 is shorter than the bracket attaching member 7 and extends upwardly and centrally from the front edge of the bracket attaching member.

The bracket supporting member 8 is of inverted V-form in elevation. The end edges of the bracket attaching member 7 incline in the direction of the lower edge of the bracket supporting member 8 and these edges and the edges of the bracket supporting member are bent to receive a reinforcing wire 13. The bracket attaching member 7 is provided forwardly beyond the lens retaining ring 3 with an opening 14 through which some of the rays of the headlight pass. While it extends forwardly beyond the headlight in a position to permit some of the light rays to pass through its opening 14, the bracket attaching member 7 does not extend below the lens retaining ring 3, and in view thereof does not have any appreciable dimming effect on the headlight.

The colored member or button 9 is made of glass having its rear face provided with a plurality of triangular surfaces. The button 9 is arranged rearwardly of the bracket carrying member 8 and directly above the opening 14 and the bracket attaching member 7, to the end that it may be illuminated by the headlight, and to the end that it may be clearly visible from a point above and rearwardly of the headlight. The button 9 is mounted in a holder 15 which is provided with a bolt 16 extending forwardly through the bracket and attaching member 8. A nut 17 engaging with the bolt 16 and contacting with a washer 18 mounted on the bolt, serves to secure the holder 15 and its button 9 in place.

In practice, a telltale is secured to each headlight of an automobile. The colored members or buttons are supported by the brackets on the headlights in such position as to render them clearly visible from the driver's seat of the automobile. When the headlights are lit those rays thereof that pass through the openings in the bracket attaching members illuminate the colored members or buttons. In view thereof, and as the colored members or buttons are clearly visible from the driver's seat, the driver may at any time ascertain, without leaving the seat, whether one or both of the headlights are lit.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

A telltale for an automobile headlight, comprising a member adapted to be secured to the upper side of the headlight with a portion thereof extending forwardly from the headlight and provided with an opening located to permit some of the rays of the headlight to pass therethrough, a second member extending upwardly from the front end of said first member in advance of said opening, a prismatic member carried by the rear side of said second member and forwardly of said opening for illumination by the headlight rays passing through said opening, and means carried by said prismatic member and extending through said second member for removably securing said prismatic member to said second member.

In testimony whereof I hereunto affix my signature.

HJALMAR F. INGWARSON.